United States Patent [19]
Takasaki

[11] Patent Number: 6,000,892
[45] Date of Patent: Dec. 14, 1999

[54] WOOD SCREW

[75] Inventor: Seiichiro Takasaki, Osaka, Japan

[73] Assignee: Yao Seibyo Kabushiki Kaisha, Osaka, Japan

[21] Appl. No.: 09/208,988

[22] Filed: Dec. 11, 1998

[51] Int. Cl.[6] ............................. F16B 25/00; F16B 35/04
[52] U.S. Cl. ......................... 411/413; 411/187; 411/386; 411/387.2
[58] Field of Search ..................... 411/185, 186, 411/386, 387.2, 411, 412, 413, 187

[56] References Cited

U.S. PATENT DOCUMENTS

| | | | |
|---|---|---|---|
| 3,124,408 | 3/1964 | Oestereicher | 411/413 X |
| 4,310,272 | 1/1982 | Rich et al. | 411/185 |
| 4,844,676 | 7/1989 | Adamok | 411/413 X |
| 4,874,278 | 10/1989 | Kawashita | 411/386 |
| 5,601,553 | 2/1997 | Trebing et al. | 411/413 X |

*Primary Examiner*—Neill Wilson
*Attorney, Agent, or Firm*—Wenderoth, Lind & Ponack, L.L.P.

[57] ABSTRACT

A wood screw is proposed for use with a material made mainly of plastic waste and wood chips. The wood screw includes a shank which has leading threads extending from the tip of the tapered portion to an intermediate point of the straight portion and have a first lead angle and a first thread angle. Trailing threads extend from the intermediate point toward a head and have a second lead angle and a second thread angle. The first lead angle is greater than the second lead angle, and the first thread angle is smaller than the second thread angle.

11 Claims, 4 Drawing Sheets

WOOD SCREW

BACKGROUND OF THE INVENTION

This invention relates to a wood screw to be driven into a molding made mainly of plastic wastes with wood chips mixed therein.

Polyvinyl chloride has various desirable characteristics and is still cheap, and thus it is widely used for various building parts such as pipes and siding, and various food packages such as films and bottles. However when polyvinyl chloride is burned, dioxin is produced. Thus, it is desired to recycle polyvinyl chloride products instead of burning them to protect the environment.

There is known a method of recycling such plastic wastes. In this method, plastic wastes are melted or pulverized, and wood chips are mixed into the molten or pulverized plastic waste. The mixture thus made is molded and used as plate members such as backings of building interior members and balcony steps.

These plate members, made from a mixture of thermoplastics and wood chips, are soft. Thus, when a wood screw 10 is driven into such a plate member A1, its surface tends to bulge around the screw 10 as shown in FIG. 5A. The deeper the screw 10 is driven in, the higher the bulge 15 gets. When the screw 10 is completely driven in, the bulge 15 covers the head 11 of the screw as shown in FIG. 5B. The surface of the plate member A1 thus looks extremely unpresentable.

Thus, after the screw 10 has been driven in, it is necessary to flatten the bulge by striking it. This is extremely troublesome.

It is not exactly known how such a bulge forms. But our guess is as follows. The conventional wood screw 10 has a shank 12 with a tapered tip 13 having a rather large taper angle, i.e. about 40–45° and thus short in the axial length. The threads 14 have a rather small lead angle. Thus, the tapered tip 13 cannot be smoothly driven into the plate. Rather, the tapered tip is driven in while breaking the inner texture of the plate member with its threads. Thus, wood chips separate from the plate member and rise along the thread groove.

An object of this invention is to provide a wood screw which can suppress bulging on the surface of a material molded from a mixture of plastic waste and wood chips.

SUMMARY OF THE INVENTION

According to this invention, there is provided a wood screw comprising a shank having a straight portion, a tapered portion at one end of the straight portion, and a head at the other end of the straight portion. The tapered portion has a taper angle not more than 30°, and the shank has leading threads extending from the tip of the tapered portion to an intermediate point of the straight portion and a first lead angle and a first thread angle. Trailing threads extend from the intermediate point toward the head and have a second lead angle and a second thread angle. The first lead angle is greater than the second lead angle, and the first thread angle is smaller than the second thread angle.

Other features and objects of the present invention will become apparent from the following description made with reference to the accompanying drawings, in which:

DETAILED DESCRIPTION OF THE PREFERRED EMBODIMENT

An embodiment of this invention is described with reference to FIGS. 1–4.

Figure 1:
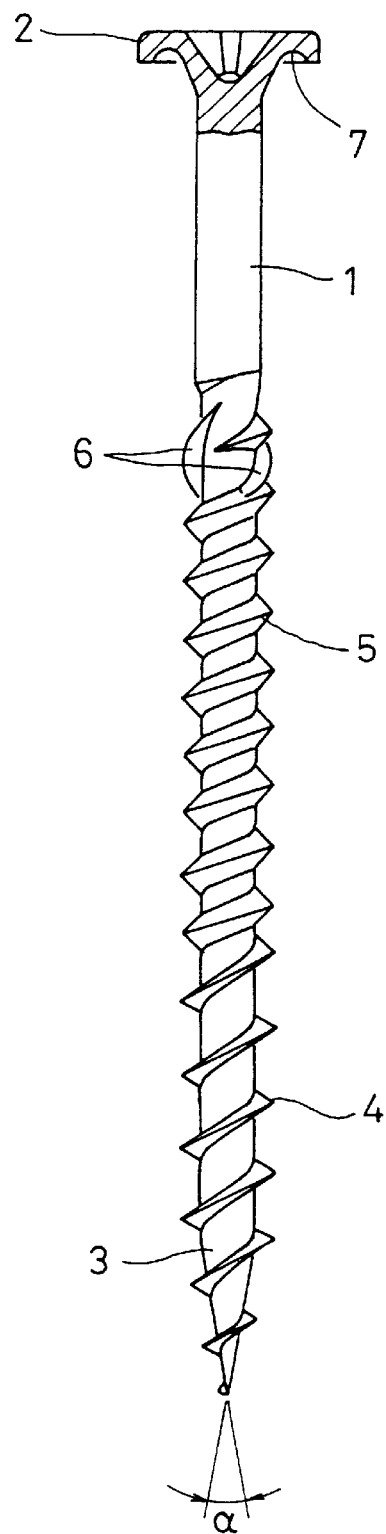
FIG. 1 is a front view of a wood screw embodying this invention.

As shown in FIG. 1, the screw has a shank comtprising a straight portion 1 and a tapered portion 3 at one end. A head 2 is provided at the other end of the shank. The tapered portion 3 has a taper angle $\alpha$ not more than 30°. Leading threads 4 are provided on the shank from the tip of the tapered portion 3 to an intermediate point of the straight portion 1. Connecting with the leading threads 4, trailing threads 5 are provided on the straight portion 1.

Figure 2:
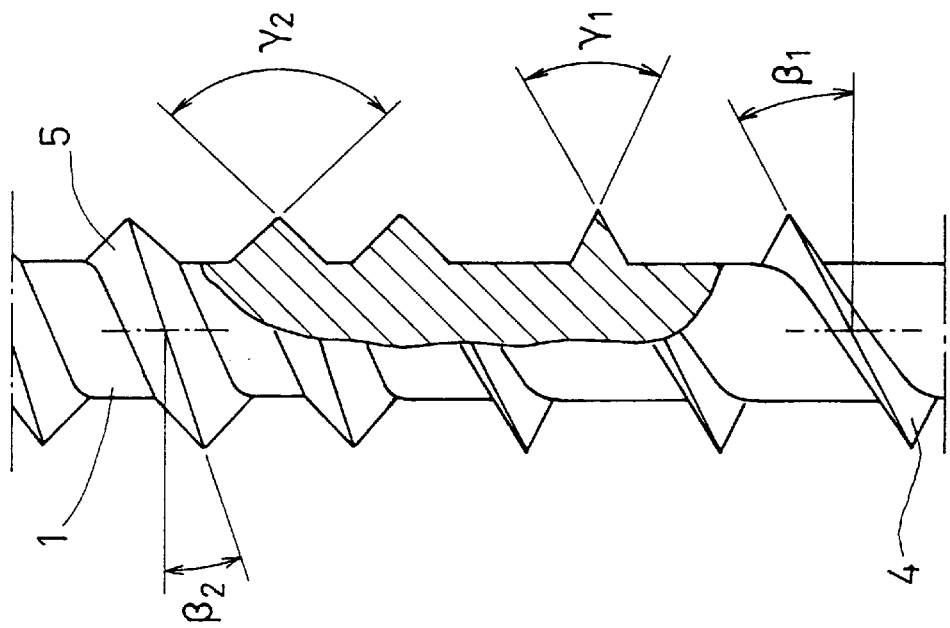
FIG. 2 is a partial, enlarged, partially cutaway front view of the wood screw shown in FIG. 1.

As shown in FIG. 2, the leading threads 4 have a lead angle $\beta 1$ greater than the lead angle $\beta 2$ of the trailing threads 5 and not smaller than 16°. The lead angle $\beta 2$ of the trailing threads 5 is equal to or smaller than 15°. The leading threads 4 have a thread angle $\gamma 1$ not more than 45°. The trailing threads 5 have a thread angle $\gamma 2$ equal to or greater than 80°.

Figure 3:
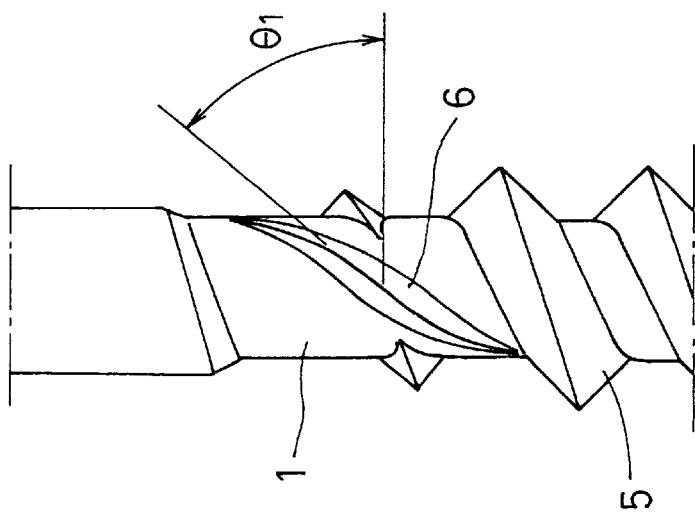
FIG. 3 is an enlarged, partially cutaway front view showing the terminal end of the trailing threads of the wood screw shown in FIG. 1.

As seen in FIG. 3, at the terminal end of the trailing threads 5, helical ribs 6 are provided circumferentially spaced from each other. The ribs 6 have a triangular section, and are inclined relative to a line perpendicular to the axis of the straight portion 1, at an angle $\theta 1$ larger than the lead angle $\beta 2$ of the trailing threads 5.

As shown in FIG. 1, the head 2 is disk-shaped and has an annular recess 7 on its underside.

FIG. 4 shows how the wood screw of this invention is driven into plate members A1, A2 laid one on the other. The overlying plate member A1 is molded from a mixture of plastics and wood chips.

Figure 4A:
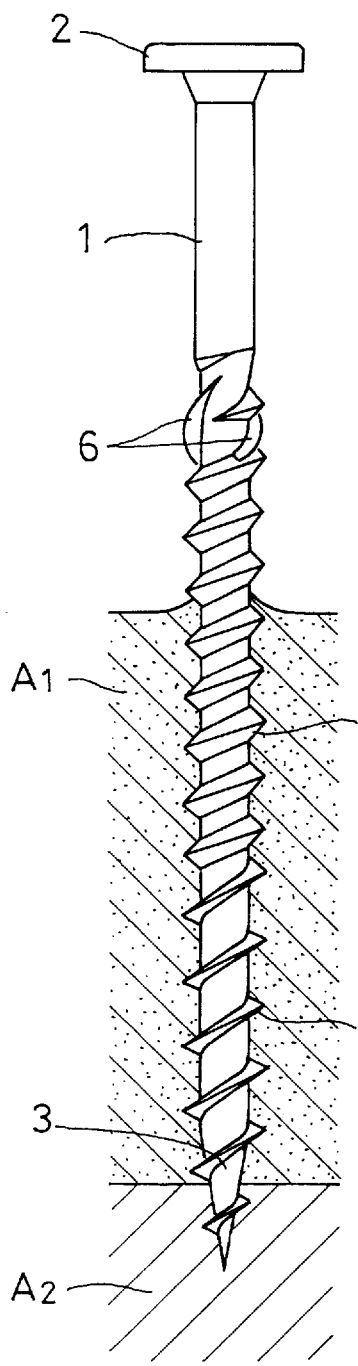
FIGS. 4A–4C are sectional views showing how the screw of FIG. 1 is driven into a plate member.
Figure 4B:
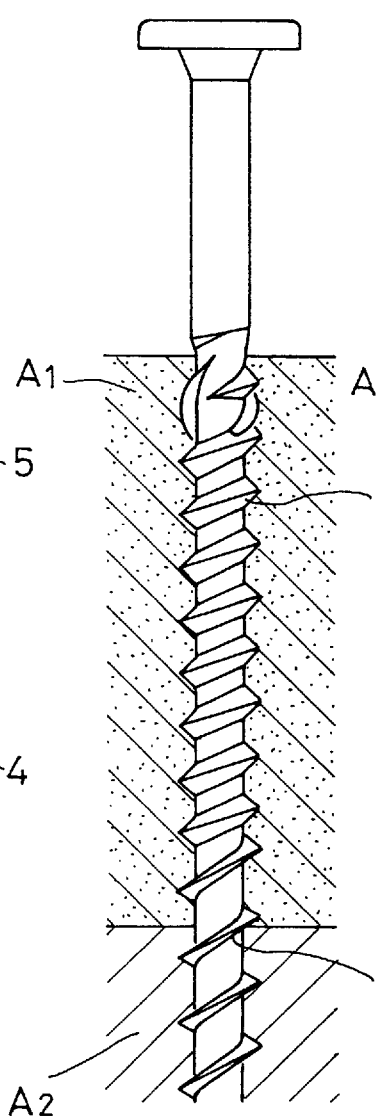

When the wood screw is driven into the plate member A1, its tapered portion 3 can smoothly penetrate into the member A1 partly due to its slender shape with a small taper angle $\alpha$ and partly due to a large lead angle $\beta 1$ of the leading threads 4. The surface of the member A1 is thus less likely to bulge. Even if a small bulge forms as seen in FIG. 4A, such a bulge will eventually disappear or decrease as shown in FIG. 4B as the trailing threads 5 are driven into the member A1 because the lead of the screw is determined by the lead of the leading threads 4 which is larger than that of the trailing threads 5.

Due to the difference in lead angle, the trailing threads 5 do not proceed along the thread grooves formed in the member A1 by the leading threads 4, so that the member A1 is plastically deformed by the trailing threads 5. The thread grooves formed in the member A1 are crushed or deformed by the trailing threads 5, providing flexibility at the contact portions between the plate member and the trailing threads 5.

Thus, if the thread angles $\gamma 2$ and $\gamma 1$ of the trailing threads 5 and the leading threads 4 are substantially the same, the contact area between the plate member and the trailing threads 5 tends to be small, so that the wood screw may slip while being driven in.

According to the present invention, since the trailing threads 5 have a large thread angle $\gamma 2$, i.e. 80° or larger, they have to proceed through the plate A1 while pushing aside its inner texture, so that the contact resistance scarcely decreases. That is, the trailing threads are kept strongly engaged with the inner texture.

Since the plurality of helical ribs 6 provided at the terminal end of the trailing threads 5 have an inclination angle θ1 greater than the lead angle β2 of the trailing threads 5, the ribs 6 will shave off the edge of the threaded hole formed by the trailing threads 5 when driven in the plate member. Thus, even if there remains a bulge along the edge of the threaded hole as seen in FIG. 4A, such a bulge will be shaved off by the ribs 6.

Figure 4C:
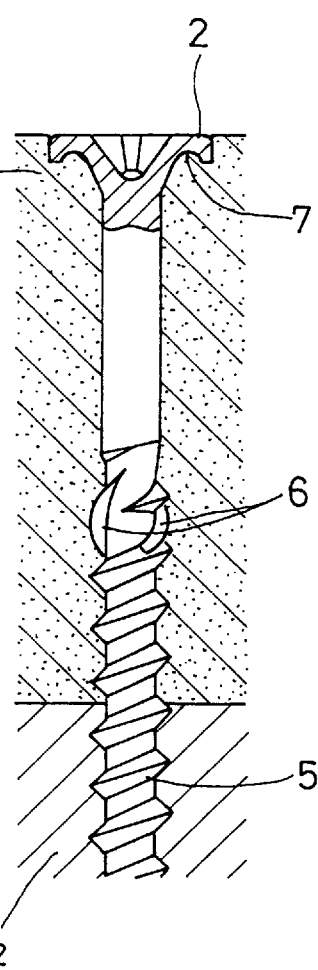
Figure 5A:
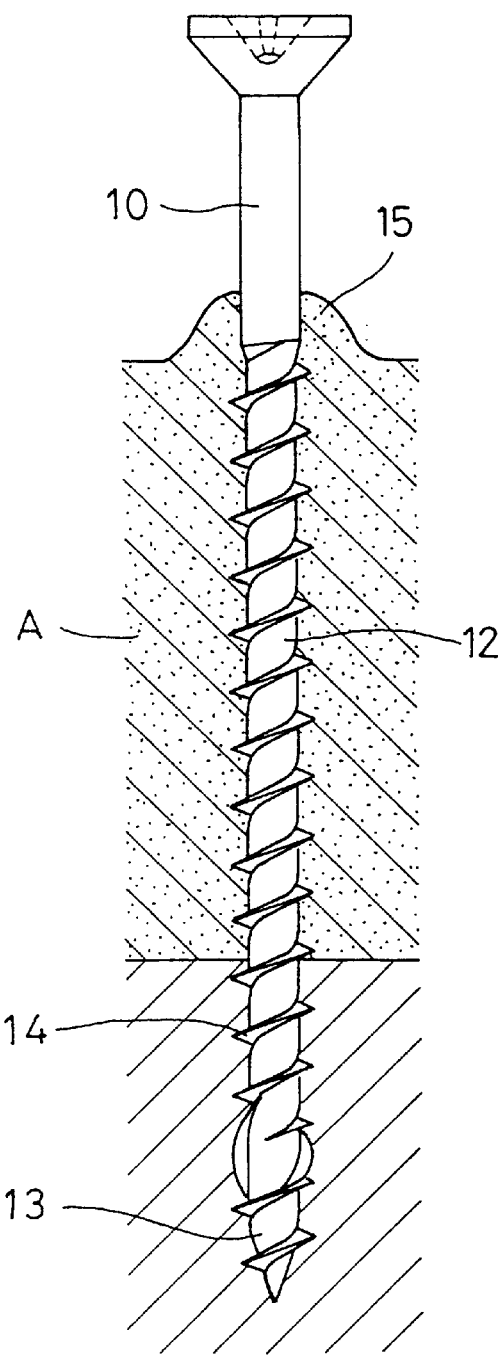
FIGS. 5A and 5B are sectional views showing how a conventional wood screw is driven into a plate member.
Figure 5B:
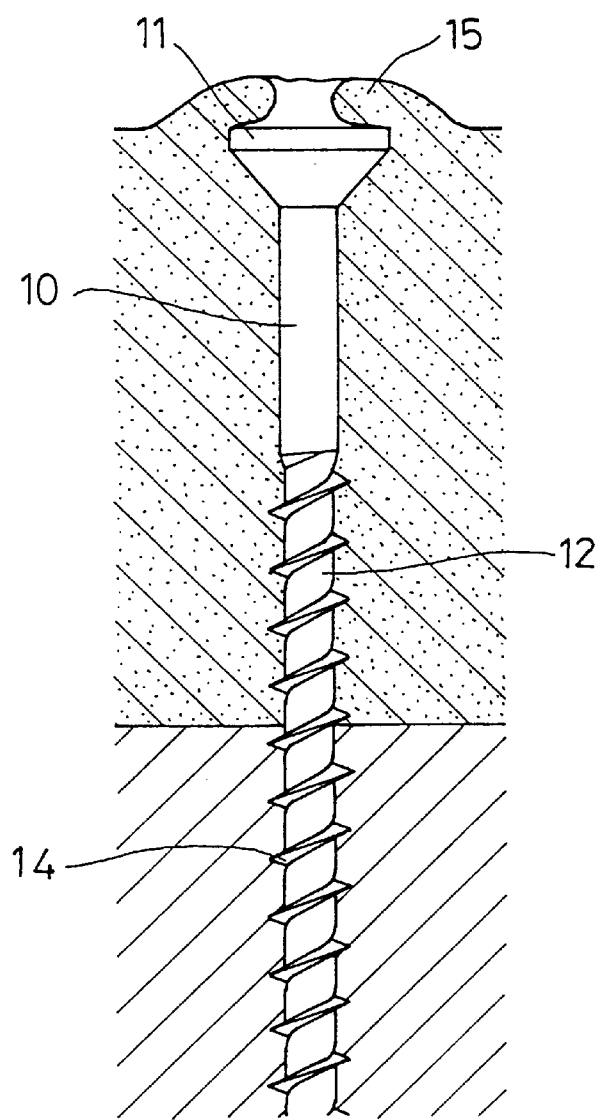

FIG. 4C shows the state when the wood screw has been completely driven in. As shown, the head 2 is completely buried in the plate member A1. The annular recess 7 serves to confine any bulge that remains on the surface of the plate member A1, thus preventing the bulge from protruding from the head 2.

With the wood screw completely driven into the plate, the helical ribs 6 engage the plate member A1, preventing loosening of the screw.

What is claimed is:

1. A wood screw comprising a shank having a straight portion, a tapered portion at one end of said straight portion, and a head at the other end of said straight portion, said tapered portion having a taper angle not more than 30°, said shank having leading threads extending from the tip of said tapered portion to an intermediate point of said straight portion and having a first lead angle and a first thread angle, and trailing threads extending from said intermediate point toward said head and having a second lead angle and a second thread angle, said first lead angle being greater than said second lead angle, and said first thread angle being smaller than said second thread angle.

2. A wood screw as claimed in claim 1 wherein said first thread angle is not more than 45° and said second thread angle is not less than 80°.

3. A wood screw as claimed in claim 1 further comprising helical ribs provided at the terminal end of said trailing threads and having a triangular section, said ribs being inclined relative to the axis of said straight portion, the inclination angle of said helical ribs relative to a line perpendicular to the axis of said straight portion being greater than said second lead angle.

4. A wood screw as claimed in claim 1 wherein said head has an annular recess in a bottom surface thereof.

5. A wood screw as claimed in claim 2 further comprising helical ribs provided at the terminal end of said trailing threads and having a triangular section, said ribs being inclined relative to the axis of said straight portion, the inclination angle of said helical ribs relative to a line perpendicular to the axis of said straight portion being greater than said second lead angle.

6. A wood screw as claimed in claim 2 wherein said head has an annular recess in a bottom surface thereof.

7. A wood screw as claimed in claim 3 wherein said head has an annular recess in a bottom surface thereof.

8. A screw fastener for penetrating and securing plastic material having wood chips mixed therein, said screw fastener comprising a shank having a straight portion, a tapered portion at a leading end of said straight portion, and a head portion at a trailing end of said straight portion, said tapered portion having a taper angle which less than or equal to 30 degrees, said shank having leading threads extending from a tip of said tapered portion to an intermediate point of said straight portion, said leading threads having a first lead angle and a first thread angle, and said shank further having trailing threads extending from said intermediate point toward said head portion, said trailing threads having a second lead angle and a second thread angle, wherein said first lead angle is greater than said second lead angle, and said first thread angle is smaller than said second thread angle.

9. A screw fastener as claimed in claim 8, wherein said first thread angle is less than or equal to 45 degrees, and said second thread angle is greater than or equal to 80 degrees.

10. A screw fastener as claimed in claim 8, further comprising a plurality of helical ribs provided between a terminal end of said trailing threads and said head portion, each of said helical ribs having a triangular section and being inclined at an inclination angle relative to a longitudinal axis of said straight portion, wherein the inclination angle of said helical ribs, relative to a line which is perpendicular to the longitudinal axis of said straight portion, is greater than said second lead angle.

11. A screw fastener as claimed in claim 8, wherein said head has an annular recess formed in a bottom surface thereof.

* * * * *